United States Patent [19]

Schubert et al.

[11] 4,373,048

[45] Feb. 8, 1983

[54] HIGH VOLTAGE FLAME RETARDANT EPOM INSULATING COMPOSITIONS

[75] Inventors: Paul C. Schubert; Anil C. Thakrar, both of Camp Hill, Pa.

[73] Assignee: AMP Incorporated, Harrisburg, Pa.

[21] Appl. No.: 286,806

[22] Filed: Jul. 27, 1981

Related U.S. Application Data

[63] Continuation-in-part of Ser. No. 142,277, Apr. 21, 1980, abandoned.

[51] Int. Cl.³ .................... C08K 5/06; C08K 3/38; C08K 3/22
[52] U.S. Cl. .................... 524/371; 174/110 SR; 524/224; 524/249; 524/322; 524/377; 524/405; 524/432; 524/434; 524/437
[58] Field of Search .............. 260/45.75 B, 45.7 RL, 260/45.9 NW, 42.33, 42.15, 45.7 R, 23.5 A, 32.6 A, 760, 761, 33.6 A, 33.6 AQ; 174/110 SR, 117; 524/371, 224, 249, 322, 377, 405, 434, 437; 264/130, 134, 331.12–331.17; 525/199, 200

[56] References Cited

U.S. PATENT DOCUMENTS

| | | | |
|---|---|---|---|
| 3,769,370 | 10/1973 | Martin et al. | 525/199 |
| 3,878,319 | 4/1975 | Wahl | 260/45.7 |
| 3,911,202 | 10/1975 | Stine et al. | 260/45.7 |
| 3,935,042 | 1/1976 | Wahl | 260/45.7 |
| 4,001,126 | 1/1977 | Penneck | 260/45.7 |
| 4,059,561 | 11/1977 | Arai et al. | 260/45.7 RL |
| 4,096,351 | 6/1978 | Wargin et al. | 174/110 |
| 4,125,509 | 11/1978 | Vostovich | 260/42.33 |
| 4,133,936 | 1/1979 | Vostovich | 260/45.7 |
| 4,183,887 | 1/1980 | Karg | 264/130 |
| 4,211,692 | 7/1980 | Barkis | 260/45.7 |

FOREIGN PATENT DOCUMENTS 2310050  9/1973  Fed. Rep. of Germany ...... 525/200

*Primary Examiner*—V. P. Hoke
*Attorney, Agent, or Firm*—Russell J. Egan

[57] ABSTRACT

An ethylene propylene diene terpolymer composition is suitable for use as an insulator in high voltage electrical connector applications, said insulator being characterized by excellent flame retardancy and resistance, low cost, excellent tensile strength, elongation and Shore "A" Hardness with good flow during molding, the insulator comprising a cured and molded product formed from a composition comprising ethylene propylene diene terpolymer, fillers, a synergistic mixture of flame retardant agents comprising at least a brominated organic flame retardant, a hydrated alumina, antimony oxide, and a flow improver.

24 Claims, 2 Drawing Figures

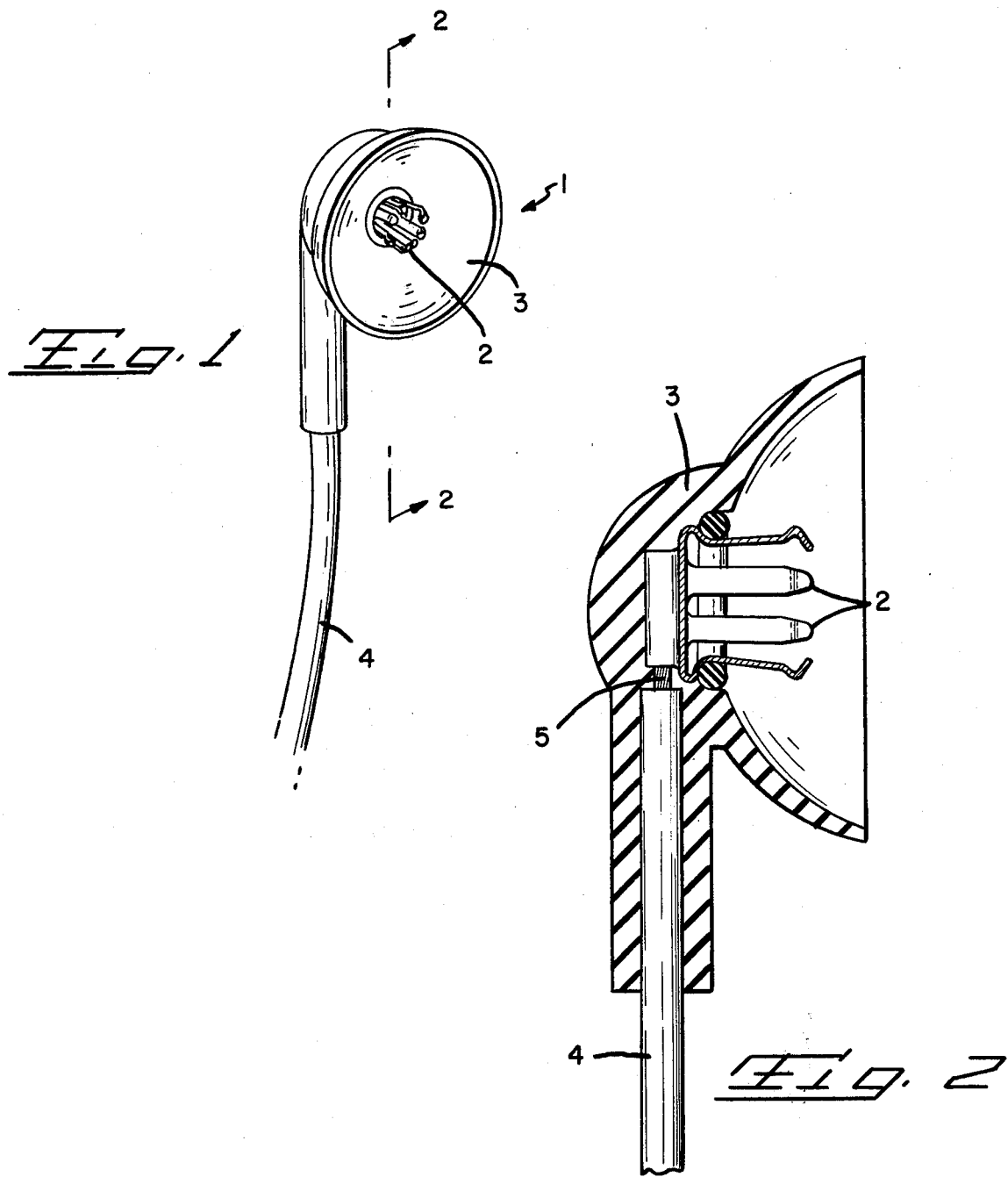

HIGH VOLTAGE FLAME RETARDANT EPDM INSULATING COMPOSITIONS

This application is a continuation-in-part of Ser. No. 142,277 filed Apr. 21, 1980, now abandoned.

TECHNICAL FIELD

This invention relates to compositions suitable for molding high voltage insulating materials which are formed from ethylene propylene diene terpolymer compositions having good electrical characteristics and excellent flame retardancy combined with low cost.

BACKGROUND ART

Substantial prior art is available in the art of insulators including insulators useful for high voltage applications. Such insulators have been produced from a variety of compositions including the use of ethylene propylene rubber, as well as ethylene propylene diene terpolymer compositions or the so-called EPDM polymers. For example, U.S. Pat. Nos. 3,878,319; 3,935,042; 4,125,509 and 4,133,936 describe insulators for electrical applications such as power cables which comprise a thermoset ethylene propylene rubber.

It is known from Luh, D. R., "Ethylene Propylene Terpolymers in Wire and Cable Constructions," Wire & Wire Products, 4-70, pp. 79-81 (1970), that EPDM terpolymers provide a highly useful combination of characteristics which makes such polymers desirable in cable construction. For example, the polymers have excellent resistance to the deteriorating effects of ozone, oxygen, weather, heat and many chemicals, while also having good mechanical properties and excellent electrical and low temperature characteristics.

Ethylene propylene terpolymers (designated EPDM by the American Society for Testing and Materials) have been synthesized using a variety of dienes. One method of preparation involves the terpolymers of ethylene, propylene, and 1,4-hexadiene. The main polymer chain is completely saturated and consists of randomly arranged ethylene and propylene units with pendant diene units spaced at less frequent intervals. These terpolymers offer broad curing versatility; thus vulcanization can be accomplished either by using sulfur-based systems that permit cross-linking through the pendant double bond, or by using organic peroxides that develop crosslinks through both the pendant double bond and the main polymer chain. Radiation may be used.

While the ethylene propylene terpolymers provide a highly desirable combination of excellent resistance to the deteriorating effects of ozone, oxygen, weather, heat and many chemicals, with good mechanical properties and excellent electrical and low temperature characteristics, they do have the disadvantage that being hydrocarbon products, they are not inherently resistant to flame. The present invention provides EPDM products which overcome this disadvantage.

EPDM terpolymers have also been used in various flame resistant compositions. Thus, U.S. Pat. No. 4,125,509 discloses ethylene propylene rubber compositions having flame resistant properties, which compositions contain chlorosulfonated polyethylene, zinc oxide, hydrated alumina and amorphous silica. U.S. Pat. No. 4,211,692 discloses coating compositions for polyolefin substrates which comprise EPDM terpolymer rubber, a high density polyethylene and ethylene-propylene block copolymer, and an ethylene-isobutyl-acrylate copolymer, together with optional stabilizers, flame retardants, and pigments. The fire retardant compositions in this patent comprise one or more polyhalogenated organic compounds and antimony trioxide. U.S. Pat. No. 4,059,561 discloses flame resistant compositions comprising ring-opening polymerization products of norbornene derivatives wherein the flame resistant components comprise halogen-containing aromatic compounds. Metal inorganic compounds such an antimony trioxide and zinc borate may also be present in the composition.

U.S. Pat. Nos. 3,911,202; 4,001,128 and 4,096,351 describe high voltage insulating materials produced from ethylene propylene diene terpolymers which are available commercially. The above described patents provide insulator products resulting from EPDM materials which have various characteristics with respect to elongation, hardness, tensile strength and the like.

To the applicants' knowledge, however, none of these prior art materials have suitable fire retardant characteristics so as to be used commercially in high voltage applications for electrical use. The present invention provides an EPDM composition which has outstanding flame retardant characteristics, excellent tensile strength, elongation and hardness and good flow during the molding process.

OBJECTS OF THE INVENTION

It is accordingly one object of the present invention to provide an insulator having a good combination of chemical, mechanical and electrical characteristics from ethylene propylene diene terpolymers.

A further object of the invention is to provide an insulator produced by molding a composition containing ethylene propylene diene terpolymers, which insulator has excellent flame retardancy and other characteristics.

It is a still further object of the present invention to provide an insulator suitable for high voltage applications which comprises a composition formed from ethylene propylene diene terpolymers, fillers and a synergistic mixture of flame or fire retardant agents and flow improvers.

Other objects and advantages of the present invention will become apparent as the description thereof proceeds.

In satisfaction of the foregoing objects and advantages, there is provided by this invention an insulating material suitable for high voltage applications which is formed from a composition comprising:

(a) an ethylene propylene diene terpolymer composition, (b) fillers to provide reinforcement for said polymer, and (c) a synergistic mixture of fire retardant agents comprising at least a brominated organic fire retardant, a hydrated alumina, an antimony oxide and a flow improver; said insulator being characterized by excellent flame retardancy, tensile strength, elongation and shore hardness with good flow during molding.

Also provided are electrical insulating products produced from said insulator composition as well as methods for their production.

BRIEF DESCRIPTION OF THE DRAWINGS

Reference is now made to the drawings accompanying the present invention wherein:

FIG. 1 shows a contact insulator produced according to the invention; and

FIG. 2 shows an enlarged cross-section of the device of FIG. 1 along the lines 2—2.

BEST MODE FOR CARRYING OUT THE INVENTION

As pointed out above, the present invention provides an insulator composition produced from ethylene propylene diene terpolymers which is exceptional for use in high voltage electrical applications. The insulator is particularly advantageous over those known in the prior art in that it is characterized by excellent flame retardancy and resistance, excellent tensile strength and elongation and Shore "A" Hardness. It is also capable of production at substantially lower cost than the so-called siloxane products presently being used commercially in high voltage applications and is advantageous over such siloxane products in exhibiting excellent flame retardancy together with the required electrical characteristics for high voltage use. Additionally, the composition used to produce the insulator has excellent flow properties for molding into the desired insulator form. This combination of properties was unknown heretofore with respect to insulator materials produced from ethylene propylene diene terpolymers.

As pointed out above, the present invention provides insulators and similar products produced from ethylene propylene diene terpolymer compositions. The composition is provided in a form suitable for molding by compression molding, transfer molding, injection molding, insert molding, or by extrusion. The resulting products exhibit excellent flame retardancy, tensile strength, elongation and shore "A" hardness as demonstrated in standardized tests. Moreover, the polymer composition has excellent flow which makes it suitable for the molding techniques and can be produced at low cost so as to provide a product imminently suitable for high voltage insulator applications.

The insulator of this invention is formed from a homogeneous composition containing as the main component, a polymer formed from an olefinic monomer which may be referred to as a terpolymer comprising a polyethylene propylene diene composition. Thus, the base polymer component of this composition is the so-called EPDM commercial product which has excellent electrical properties and may have the following relative proportions of olefin monomers based on mol percent:

| Ethylene | 40–90% |
| Propylene | 50–10% |
| Diene | 3–10% |

In the present invention, the preferred relative proportion based on mol percent comprises 50–70% of ethylene, 50–25% of propylene and 2–5% of diene. The diene may be ethylidenenorbornene, 1,4-hexadiene, methylenenorbornene, or dicyclopentadiene. These polymers are fully described in U.S. Pat. No. 3,911,202.

This base polymer has favorable sensitivity to significant curing or cross linking and is highly desirable in the formation of materials required as insulators. This polymer is available from the Copolymer Rubber and Chemical Corporation under the trade name designations EPsyn 40, EPsyn 40A, EPsyn 55, EPsyn 70, EPsyn 70-A, EPsyn 4506, EPsyn 5508, EPsyn 5509, and EPsyn 7506, EPsyn being a Copolymer Corporation trademark.

This polymer, as available commercially from many established suppliers, is a general purpose high viscosity polymer designed especially for easy mill mixing and injection molding of highly loaded compounds. The product as available, however, lacks necessary hardness and tensile modulus to provide the desired shape and dimensional stability. Moreover, the product requires reinforcement and filler to provide an uncured polymer composition suitable for final curing and formulation of insulators. In the present invention, it is also necessary to provide a combination of flame retardancy and flow improved characteristics so as to obtain a resulting composition suitable for molding which will be flame retardant in high voltage applications.

In the present invention, a combination of fillers primarily based on silica are utilized in order to provide the necessary strength in the polymer. One of the members of this group is a reinforcing filler having excellent electrical properties which is anhydrous aluminum silicate in pigment form. This filler provides low compression set, low water absorption and excellent abrasion resistance to the resulting product. A material of this type is available commercially under the tradename Burgess KE, from Burgess Pigment Co., Macon, Ga.

A second filler material is a semi-reinforcing filler or extrusion aid for the composition. A suitable material of this type is a precipitated hydrated amorphous silica which provides the characteristic of easy dispersement. The EPDM elastomers will handle very high loadings of these materials and thus they are very effective as a semi-reinforcing filler in EPDM. A material of this type is available under the tradename Silene D from Harwick Chemical Corp., Akron, Ohio, or PPG Industries, Pittsburgh, Pa.

As pointed out above, an essential novelty of the present invention resides in the synergistic combination of flame retardant materials and flow improver. According to this invention, it has been found that if the flame retardant agent is provided as a mixture of brominated organic compounds, an alumina hydrate and antimony oxide in combination, with a flow improver as described hereinafter, the elastomer retains the other necessary characteristics to be used as an insulator in high voltage applications, while exhibiting excellent flame retardancy and flow during molding.

The brominated organic material provides heat stability and does not suffer the problems of "blooming" during preparation. By "blooming" is meant that the material exudes to the surface which occurs with chlorinated fire retardants but not with the brominated organic materials. A preferred material of this type is decabromodiphenyloxide which is available commercially under the tradename designation FR 300BA from Dow Chemical Corporation, Midland, Mich.

A second component of the flame retardant composition is a hydrated alumina, preferably the trihydrate of alumina. This is a highly specialized grade of alumina which, when properly dispersed, absorbs energy at high temperatures and releases water so as to act as a heat sink. This material is available from Alcoa under the tradename designation Hydral 710 and other suppliers have equivalent grades of material.

A third component of the flame retardant group is antimony oxide which is a flame retardant synergist for the brominated organic material, is a material which disperses well and is of proper particle size for the composition. In general, there should be present in the composition about 1.4–3 parts of the brominated organic flame retardant material per part of antimony oxide synergist. The antimony oxide is available as $Sb_2O_3$ in fine particle size and high purity under the trade designation Thermogard from M&T Chemicals, Inc., Rahway, N.J. and other like suppliers under their own tradenames.

An optional fourth flame retardant ingredient which may be added is polymer grade zinc borate. This material acts as a fire retardant in killing afterglow, that is, after a flame goes out in a rubbery type material, a red glow appears and this additive helps to kill the afterglow thus enhancing flame retardancy. Zinc borate is available under the trade designation Firebrake ZB from U.S. Borax & Chemical Corp., Los Angeles, Calif.

This group of flame retardants, when added to the elastomer composition in the disclosed amounts, reduces the flow of the elastomer composition and this reduced flow will cause difficulties in molding. Accordingly, a further aspect of the present invention resides in introduction into the composition of a suitable flow improver or flow promoter. In the context of this invention, a "flow improver" or "flow promoter," when contained in the composition or polymeric matrix, is present for the purpose of interfering with polymer attraction between the molecules. The flow promoter, thus, interposes itself between molecules to provide slippage and, consequently, increases the flow of the entire composition.

The flow improver or flow promoter is to be distinguished from lubricants, either the known external lubricants or internal lubricants when used individually. External lubricants, when used in elastomer compositions, are materials which are either sprayed into the mold or compounded into the composition which will provide release between the polymer and the mold. They can also be used to prevent sticking of the elastomer composition to surfaces involved in the molding processes. Internal lubricants are used to modify the cohesive forces among the polymer chains.

There are also materials available commercially which may be described as mold release agents, or parting agents. These materials provide an integral interfacial layer between the two surfaces to prevent adhesion of one to the other and, thus, acts somewhat as a lubricant. The mold release agent, therefore, provides easy removal of materials from the mold. Release agents of these types include waxes, silicones, metallic stearates and the like.

The flow improver or flow promoter of the present invention, however, appears to work in conjunction with the plasticizers and softeners, and fire retardants to increase the internal lubrication of the polymer during molding, and to provide increased flow, better release characteristics and non-sticking characteristics. Therefore, the flow improver or promoter of the invention provides advantages to the composition which cannot be achieved from the individual components, thus providing a synergistic result.

The preferred flow improvers of the present invention may be described as compositions which contain sufficient components to provide the advantages set forth above. Thus, the flow improver comprises a mixture of internal lubricants, external lubricants, mold release agents, and surfactants or anti-static agents, when provided in certain proportions. In the preferred embodiment of the present invention, the flow improving composition comprises a composition which by analyses contain oleamide, a fatty acid such as oleic acid, dipropylene glycol, a saturated hydrocarbon oil, and a surfactant such as a long-chain alkyl alkylol amine, for example, a polyhydroxy amine. Thus, the preferred flow improving composition of the present invention comprises the following components and amounts:

| Components | Composition (wt %) |
| --- | --- |
| Oleamide | 17–21 |
| Oleic acid | 10–14 |
| Dipropylene glycol | 33–37 |
| $C_{16}$–$C_{18}$ hydrocarbon oil | 23–27 |
| Polyhydroxy amine | 8–12 |

The most preferred flow improving composition of the present invention is a composition which is available commercially from Axel Research Laboratories, Inc. under the trade designation INT-EQ-6. This composition contains about 18 wt% of oleamide, about 12% of oleic acid, about 35% of dipropylene glycol, about 25% of a $C_{16}$–$C_{18}$ hydrocarbon oil, and about 10% of a polyhydroxy amine surfactant.

Other flow promoting agents having similar characteristics may, of course, also be used in the present invention. One such material is sold in the form of a powder under the trade designation Fluoropolymer PPA-790 by Monsanto.

The above represents the essential materials for the elastomer composition to be compounded into a homogeneous mixture in the formation of the resulting insulator. However, a number of other materials are preferably added to the composition to provide the resulting excellent combination of properties. Thus, a plasticizer is suitably added to provide low temperature flexibility or to act as a softener for the EPDM polymer where low plasticizer volatility is required. A suitable material of this type is a paraffinic oil sold under the tradename Sunpar 2280, and identified by ASTM D226 Type 104B from Sun Oil Company, Philadelphia, PA.

It is also usual to add coloring materials to the composition and a suitable ingredient is red lead oxide which has also been found to lend electrical properties and help to activate the resulting cure as well as provide a pleasing color. The red lead oxide is available commercially from Wyrough & Loser, Inc., Trenton, N.J. This material is especially suitable since it acts as an activator and improves the electrical properties. Obviously, other colorants may also be used.

It is also preferable to add an antioxidant to the composition, especially a high activity antioxidant which also is nonblooming and persists at higher temperatures. A preferable antioxidant is Flectol H, which is available commercially under this tradename from Monsanto, Organic Rubber Division, Akron, Ohio. A similar material is sold by R. T. Vanderbilt, Inc., as Agerite D. This material is an organic material comprising copolymerized 1,2-dihydro-2,2,4-trimethyl quinoline.

An activator and stabilizer for the polymer and a material which also lends some heat resistance, is zinc oxide in fine particle size and high purity. A zinc oxide suitable for this purpose is available as French process zinc oxide treated with propionic acid sold under the trade designation Protox 169 from Gulf & Western Natural Resources Group with other suppliers providing similar materials under their own tradenames.

It is also desirable that an alkaline earth metal salt of a fatty acid such as calcium stearate be added as an internal lubricant for incorporation into the composition as this material is nonsticking. The calcium stearate product is available from Harwick Chemical Corporation, Akron, Ohio and other established suppliers.

In a mixture of this type, it is also necessary to cure the resulting composition for use as an insulator. While the cure may be effected by radiation or with sulfur as known in the art, it is preferable in this invention that a peroxide cure be employed. A suitable curing agent is a material such as dicumyl peroxide or equivalent. The peroxide is preferably used in conjunction with a peroxide synergist to provide faster and tighter cure. A material of this latter type which also provides some plasticizer characteristics during mixing as well as acting as a hardener is a trimethylolpropane trimethacrylate which is available under the trade designation SR-350 from Sartomer Co. The dicumyl peroxide is preferably obtained as dicumyl peroxide on precipitated calcium carbonate under the trade designation DiCup 40C from Hercules Incorporated, Process Chemicals Division, Wilmington, Del. This material is especially suitable since it acts as a vulcanizing agent for the EPDM polymer and enhances low compression set and heat resistance. Obviously, other curing agents may also be used as known in the art.

It is also preferable to use in conjunction with the curing agent or cross linking agent a coupling agent such as gamma-methacryloxy propyltrimethoxy silane which is available commercially under the tradename Silane A-174 from Union Carbide with other suppliers having similar material available.

The resulting compounding of the materials of this elastomeric composition results in a product which has outstanding elongation characteristics, good tensile strength and excellent flame retardancy, which combination of properties is unknown to the prior art at this time.

The several components of the composition are present in definite amounts based on the amount of EPDM polymer present. The following composition represents the broadest concept of the invention including the essential components and amounts of these components. The amounts of the other components are based on the use of each 100 parts of EPDM.

| Component | Amounts - Parts by wt. |
| --- | --- |
| EPDM Polymer | 100 |
| Fillers | 65-110 |
| Flame Retardants | 40-120 |
| Flow Improvers | 5-15 |
| Curing Agents | 7-20 |

While the above represents the essential components of the formulation, the following sets forth the essential components as well as the optional components which form a best embodiment of the present invention.

| Component | Amounts - Parts by wt. |
| --- | --- |
| EPDM Polymer | 100 |
| Silica Filler | 25-42 |
| Aluminum Silicate Filler | 40-75 |
| Brominated Organic Flame Retardant | 20-50 |
| Aluminum Hydrate Flame Retardant | 15-40 |
| Antimony Oxide Flame Retardant | 10-30 |
| Paraffinic Oil Plasticizer | 5-20 |
| Zinc Borate Flame Retardant | 10-25 |
| Coloring Agent | 1-10 |
| Antioxidant | 0.1-2 |
| Zinc Oxide Activator and Stabilizer | 2-12 |
| Flow Improver | 5-15 |
| Curing Agent | 5-10 |
| Synergist for Curing Agent | 2-10 |
| Silane Coupling Agent | 0.1-2 |
| Calcium Stearate Processing Aid | 0.5-5 |

The following is the most highly preferred formulation of the elastomer composition of the present invention for the production of commercially useful insulators.

| Component | Amounts - Parts by wt. |
| --- | --- |
| EPDM Polymer | 100 |
| Amorphous Silica Filler | 30 |
| Aluminum Silicate Filler | 60 |
| Paraffinic Oil Plasticizer | 10 |
| Brominated Organic Flame Retardant | 35 |
| Aluminum Hydrate Flame Retardant | 25 |
| Antimony Oxide Flame Retardant | 20 |
| Zinc Borate Flame Retardant | 17.5 |
| Flow Improver | 12.5 |
| Antioxidant | 0.5 |
| Coloring Agent | 5 |
| Zinc Oxide Activator and Stabilizer | 4 |
| Peroxide Curing Agent | 7 |
| Synergist for Curing Agent | 5 |
| Silane Coupling Agent | 1 |
| Calcium Stearate Processing Aid | 2 |

In production of the insulators of the present invention, the above described ingredients of the formulation are compounded to form a homogeneous mixture and subjected to molding or extrusion to produce the desired final product such as an insulator. The product may be produced by systems of molding including compression molding, transfer molding, injection molding, insert molding or extrusion. The molding conditions roughly comprise a temperature of 300°-390° F. (149° C.-199° C.), more preferably 325°-350° F. (163° C.-177° C.). Residence time for transfer molding is in the range of about 3-4 minutes and dwell time for injection molding, abut 2-3 minutes.

The compound of the formulation for subsequent molding may be made in any suitable manner, but preferably using a Banbury Mixer technique. The Banbury Mixer technique has one and two pass systems both of which start by introducing the polymer into the mixer to be softened by shear and heat. Then fillers and dry ingredients are added and mixed until a homogeneous mixture is obtained. Thereafter, the liquid components are added and mixed to achieve a homogeneous mixture. At this point for the two pass system, the mixture is removed and cooled, after which it is reintroduced to the mixer and at a lower temperature the catalyst or curing agents are added in the second pass and the mixture can be stored and subsequently placed in mold to achieve the necessary curing and cross linking. In the one pass system, the catalysts or curing agents can simply be added and the mix subjected to molding and allowed to cool.

In the one pass system, the mixing is slower, for longer periods and at lower temperatures, in the range of 200°–250° F. (94° C.–122° C.). On the other hand, in the two pass system, the first pass is at 300°–325° F. (150°–165° C.) and the second pass is conducted at a lower temperature 240°–260° F. (115°–125° C.).

While the polymer components are usually formulated using a Banbury Mixer technique, it should also be pointed out that a mill mix technique may be employed involving a two roll mixer with shear at the nip of the rolls. In this embodiment, the EPDM material is placed in the mill and all flame retardant powders are added and good mixing achieved. Thereafter, all other powders are added, such as calcium stearate and then additional mixing is carried out. The liquids are added and mixed until a homogeneous mixture is obtained, the mixture is removed from the mill and cooled. After cooling, the mixture is returned to the mill, and the curing agents are quickly added and dispersed within the mixture before the temperature rises too far. The resulting homogeneous mixture is then removed and cooled.

While the mill mix technique is normally used for small batches, the Banbury mix procedure is preferably used for large scale applications.

One product produced according to the method of the invention is shown in the drawing accompanying the application. The product illustrated in the drawing comprises an insert molded insulator 1, which consists of the contact portion 2 embedded by insert molding within insulator cup 3. The contact 2 is attached to a wire 5 within the wire insulation covering 4. Usually, in preparation of an insulator of this type, the wire 5 is molded within the wire insulation 4 by conventional molding, and is then attached to the contact and the insulator molded around the contact by insert molding under the conditions described above.

The products resulting from the formulation of this invention and its molding into a final product, have excellent flame retardancy for high voltage applications. In this regard, they are superior to the silicone high voltage insulators presently used in this field and are more economical to produce. Thus, the products of the present invention exhibit excellent tensile strength, fire retardancy exceeding present EPDM insulators, elongation and Shore "A" Hardness. In this regard, the tensile strength values exceed 1000 psi minimum, as demonstrated by standard ASTM test D412, and elongation values exceed a minimum of 250% as demonstrated by standard ASTM test D412. Shore "A" hardness in the insulators of this invention is in the range of 75±5 as determined by standard ASTM test D2240.

The fire retardancy of the insulators of this invention were evaluated under standard Underwriters Laboratories Test UL94, revised to July 30, 1976. Under this determination, the insulators of this invention provide a fire retardancy value of V−0.

In molding the insulators of the present invention, it is necessary that the flow of the polymeric mixture be in the desired range. According to this invention, this is measured by spiral flow as a standard test for thermosetting material as applied to EPDM polymeric compositions. Under this test, the flow should be at least 10.0 inches at 325° F. (163° C.). If flow is insufficient, then molding is inadequate. The spiral flow of the elastomer composition of the present invention exceeds a spiral flow of 10.0 inches at 325° F. (163° C.).

As pointed out above, the insulators of the present invention are especially suitable for high voltage applications as insulators as they are good insulators up to 50 KV. Thus, they serve as replacements for more expensive siloxanes and can be used in such applications as CRT boots for cathode ray tube connectors, pin connectors and the like.

The following examples are presented to illustrate the invention, but it is not to be considered to be limited thereto. In these examples and throughout the specification, parts are by weight unless otherwise indicated.

EXAMPLE 1 were compounded using the mill mix technique:

| | |
|---|---|
| EPDM (Polymer EPsyn 7506) | 100 pts. |
| Amorphous (Silica Filler Silene D) | 30 pts. |
| Aluminum (Silicate Filler Burgess KE) | 60 pts. |
| Trimethylol Propane Trimethacrylate (Peroxide Synergist SR-350) | 5 pts. |
| Paraffinic Oil (Plasticizer Sunpar 2280) | 10 pts. |
| Gamma-Methacryloxypropyltrimethoxysilane (Coupling Agent - Silane A-174) | 1 pt. |
| Red Lead Oxide (Colorant Red Lead in EPDM Binder - 90% Red Lead) | 5 pts. |
| Polymerized 1,2-Dihydro-2,2,4-trimethylquinoline (Antioxidant - Flectol H) | 0.5 pts. |
| Decabromodiphenyloxide (Flame Retardant FR-300BA) | 35 pts. |
| Aluminum Trihydrate (Flame Retardant Hydral 710 ATH) | 25 pts. |
| Antimony Oxide ($Sb_2O_3$) - (Flame Retardant Thermogards) | 25 pts. |
| Zinc Oxide - (Activator, Stabilizer Protox 169) | 4 pts. |
| Calcium Stearate - (lubricant) | 2 pts. |
| Zinc Borate (Flame Retardant Firebrake ZB) | 17.5 pts. |
| Dipropylene Glycol Based Flow Improver (INT-EQ-6) | 12.5 pts. |
| Dicumyl Peroxide on Precipitated $CaCO_3$ (DiCup 40C) | 7 pts. |

In compounding the formulation, the EPDM polymer was dispersed into the mill, all the flame retardant powders added and mixing achieved. Thereafter, all other powders were added and mixing continued at a temperature of 150° F. (65° C.). Finally, the liquids were added, good dispersion achieved and the mixture removed from the mill and cooled. After cooling, the mixture was returned to the mill, the curing agents were added and a good dispersion obtained. The mixture was then removed from the mill and cooled in the form of a sheet. The resulting polymeric sheet was molded and then post-cured by heating in an oven at 250° F. (122° C.) for 3 to 5 hours.

The resulting molded product exhibited a tensile strength of 1174 psi, elongation of 295%, spiral flow during curing at 325° F. (163° C.) of 10.6 inches, and Shore "A" Hardness of 73. The fire retardancy test under UL 94 showed a rating of V—0, which is excellent.

EXAMPLE 2

In this example, the following formulation was employed and mixed under the Banbury Mill Mixing technique:

| | |
|---|---|
| EPDM Polymer (EPsyn 7506) | 100 pts. |
| Amorphous Silica Filler (Silene D) | 30 pts. |
| Aluminum Silicate Filler (Burgess KE) | 60 pts. |
| Trimethylol Propane Trimethacrylate (Peroxide Synergist - SR-350) | 5 pts. |
| Paraffinic Oil Plasticizer (Sunpar 2280) | 10 pts. |
| Gamma-Methacryloxypropyl-trimethoxysilane (Coupling Agent - Silane A-174) | 1 pt. |
| Red Lead Oxide Colorant (Red Lead in EPDM Binder - 90% Red Lead) | 5 pts. |
| Polymerized 1,2-dihydro-2,2,4-trimethylquinoline (Antioxidant - Flectol H) | 0.5 pts. |
| Decabromodiphenyloxide Flame Retardant (FR-300BA) | 35 pts. |
| Aluminum Trihydrate Flame Retardant (Hydral 710 ATH) | 25 pts. |
| Antimony Oxide ($Sb_2O_3$) - Flame Retardant (Thermogards) | 25 pts. |
| Zinc Oxide - Activator, Stabilizer (Protox 169) | 4 pts. |
| Calcium Stearate - lubricant | 2 pts. |
| Zinc Borate Flame Retardant (Firebrake ZB) | 17.5 pts. |
| Dipropylene Glycol Based Flow Improver (INT-EQ-6) | 12.5 pts. |
| Dicumyl Peroxide on Precipitated $CaCO_3$ (DiCup 40C) | 12.5 pts. |

In this technique the polymer was placed in the mixer and softened by shear and heat. Then the fillers and dry ingredients were added and mixed at a temperature of 300°–325° F. (149° C.–163° C.) until a homogeneous mixture was achieved. Thereafter the liquids were added and mixed until a homogeneous mix was obtained. The mixture was then removed from the mixer and cooled. After cooling, the mix was returned to the mill at 150° F. (65° C.), the curing catalysts were added and good mixing achieved. Complete cross linking of the polymer is accomplished during molding of the material into a flat sheet. After molding the product was subjected to post-curing by heating overnight at 125° C. (257° F.). The resulting product exhibited a tensile strength of 1072 psi, an elongation of 275%, a spiral flow at 325° F. (163° C.) of 10.6 inches, Shore "A" Hardness of 76 with a UL-94 rating for fire retardance of V—0.

EXAMPLE 3

In this example, the EPDM polymer mixture of Example 2 is compounded in the Banbury Mill until the liquids are added and a homogeneous mix is obtained. The composition is then removed from the Mill and cooled. Thereafter, the curing catalysts are added and the mixture is molded in an insert mold at 350° F. (177° C.) with a dwell time of 3 minutes. After molding the product is post-cured by heating overnight at 120° C. (257° F.). The resulting contact insulator exhibited the same characteristics as in Example 2.

In the foregoing examples, the flow improver, referred to as INT-EQ-6, is available commercially under this trade designation from Axel Research Laboratories, Inc. The INT-EQ-6 flow improver has the following compositions:

| Component | Wt. % |
|---|---|
| Oleamide | 18 |
| Oleic Acid | 12 |
| Dipropylene Glycol | 35 |
| $C_{16}$–$C_{18}$ Hydrocarbon Oil | 25 |
| Polyhydroxyamine | 10 |

The invention has been described herein with reference to certain preferred embodiments; however, obvious variations thereon will become apparent to those skilled in the art. The invention is not to be considered as limited thereto.

What is claimed is:

1. An ethylene propylene diene terpolymer composition suitable for use as an insulator in high voltage electrical connector applications, said composition comprising an ethylene propylene diene terpolymer, reinforcement fillers, a curing agent and a synergistic mixture of fire retardant agents and flow improvers comprising at least (1) a brominated organic flame retardant, (2) a hydrated alumina flame retardant, (3) an antimony oxide synergist, and (4) a flow improver, which synergistic mixture increases the flow of the composition during molding, increases internal lubrication, and provides better release and non-sticking characteristics, said composition being characterized by good flame retardancy, tensile strength, elongation and Shore "A" Hardness with good flow during molding.

2. A composition according to claim 1 which contains a reinforcing filler and a semi-reinforcing filler in said composition.

3. A composition according to claim 2 wherein said composition contains about 1.4 to 3 parts of the brominated organic flame retardant per part of antimony oxide synergist.

4. A composition according to claim 3 wherein the curing agent comprises an organic peroxide.

5. A composition according to claim 4 wherein said ethylene propylene diene terpolymer is a polymer formed by reaction of 40–90 mol percent ethylene, 40–10 mole percent propylene, and 3–10 mol percent of a diene.

6. A composition according to claim 2 wherein said composition contains a reinforcing filler comprising an anhydrous aluminum silicate in pigment form and a semi-reinforcing filler comprising a precipitated amorphous silica.

7. A composition according to claim 3, wherein said brominated organic flame retardant is decabromodiphenyl-oxide.

8. A composition according to claim 7 wherein said hydrated alumina flame retardant is a tri-hydrate of alumina.

9. A composition according to claim 1 wherein said flow improver is a mixture of internal lubricants, external lubricants, mold release agents and surfactants.

10. A composition according to claim 8 wherein said composition also contains a polymer grade zinc borate as a flame retardant for killing after glow.

11. A composition according to claim 10 wherein said composition also contains a plasticizer to provide low temperature flexibility.

12. A composition according to claim 11 wherein the composition contains a high activity anti-oxidant.

13. A composition according to claim 12 wherein said composition contains zinc oxide in fine particle size and high purity as an activator and stabilizer.

14. A composition according to claim 13 wherein said composition contains an alkaline earth metal salt of a fatty acid as a lubricant and mold release.

15. A composition according to claim 13 wherein said composition contains red lead oxide as a coloring agent and for imparting electrical qualities.

16. A composition according to claim 14 wherein said curing agent comprises an organic peroxide in combination with a synergist comprising trimethylolpropane-trimethacrylate.

17. A composition according to claim 1 which contains the following amounts of essential ingredients:

| Component | Amounts - Parts by wt. |
| --- | --- |
| EPDM Polymer | 100 |
| Fillers | 65–110 |
| Flame Retardants | 40–120 |
| Flow Improvers | 5–15 |
| Curing Agents | 7–20 |

18. A composition according to claim 1 which contains the following components and amounts:

| Component | Amounts - Parts by wt. |
| --- | --- |
| EPDM Polymer | 100 |
| Silica Filler | 25–42 |
| Aluminum Silicate Filler | 40–75 |
| Brominated Organic Flame Retardant | 20–50 |
| Aluminum Hydrate Flame Retardant | 15–40 |
| Antimony Oxide Flame Retardant | 10–30 |
| Paraffinic Oil Plasticizer | 5–20 |
| Zinc Borate Flame Retardant | 10–25 |
| Coloring Agent | 1–10 |
| Antioxidant | 0.1–2 |
| Zinc Oxide Activator and Stabilizer | 2–12 |
| Flow Improver | 5–15 |
| Curing Agent | 5–10 |
| Synergist for Curing Agent | 2–10 |
| Silane Coupling Agent | 0.1–2 |
| Calcium Stearate Processing Aid | 0.5–5 |

19. A composition according to claim 17 which contains the following components and amounts:

| Component | Amounts - Parts by wt. |
| --- | --- |
| EPDM Polymer | 100 |
| Amorphous Silica Filler | 30 |
| Aluminum Silicate Filler | 60 |
| Paraffinic Oil Plasticizer | 10 |
| Brominated Organic Flame Retardant | 35 |
| Aluminum Hydrate Flame Retardant | 25 |
| Antimony Oxide Flame Retardant | 20 |
| Zinc Borate Flame Retardant | 17.5 |
| Flow Improver | 12.5 |
| Antioxidant | 0.5 |
| Coloring Agent | 5 |
| Zinc Oxide Activator and Stabilizer | 4 |
| Peroxide Curing Agent | 7 |
| Synergist for Curing Agent | 5 |
| Silane Coupling Agent | 1 |
| Calcium Stearate Processing Aid | 2 |

20. An insulator comprising the composition of claim 1.

21. An insulator for use in high voltage electrical systems comprising the composition of claim 17.

22. An insulator according to claim 21 produced by molding the composition of claim 1 by compression molding, transfer molding, injection molding, insert molding, or extrusion.

23. An insulator according to claim 22 wherein said molding is conducted at a temperature in the range of 300°–390° F. with residence time of 2–4 minutes.

24. An insulator for use in high voltage electrical systems comprising the molded composition of claim 19.

* * * * *

UNITED STATES PATENT AND TRADEMARK OFFICE
CERTIFICATE OF CORRECTION

PATENT NO. : 4,373,048
DATED : February 8, 1983
INVENTOR(S) : Paul C. Schubert et al.

It is certified that error appears in the above-identified patent and that said Letters Patent is hereby corrected as shown below:

Title of invention should read -- HIGH VOLTAGE FLAME RETARDANT EPDM INSULATING COMPOSITIONS --.

Signed and Sealed this

Fifth Day of August 1986

[SEAL]

Attest:

DONALD J. QUIGG

Attesting Officer

Commissioner of Patents and Trademarks